(12) United States Patent
Nguyen et al.

(10) Patent No.: US 12,192,104 B2
(45) Date of Patent: *Jan. 7, 2025

(54) CONGESTION NOTIFICATION REPORTING FOR A RESPONSIVE NETWORK

(71) Applicant: Cisco Technology, Inc., San Jose, CA (US)

(72) Inventors: Dennis Khoa Dang Nguyen, San Jose, CA (US); Keerthi Manjunathan Swarnamanjunathan, Sunnyvale, CA (US); Laura J. Sharpless, Sunnyvale, CA (US); Kelvin Chan, San Jose, CA (US); Ganga S. Devadas, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/470,153

(22) Filed: Sep. 19, 2023

(65) Prior Publication Data

US 2024/0007401 A1   Jan. 4, 2024

Related U.S. Application Data

(60) Continuation of application No. 17/339,788, filed on Jun. 4, 2021, now Pat. No. 11,843,541, which is a division of application No. 16/172,762, filed on Oct. 27, 2018, now Pat. No. 11,057,305.

(51) Int. Cl.
*H04L 47/12* (2022.01)
*H04L 5/00* (2006.01)
*H04L 41/5009* (2022.01)
*H04L 43/062* (2022.01)
*H04L 47/11* (2022.01)
*H04L 49/25* (2022.01)
*H04L 49/50* (2022.01)

(52) U.S. Cl.
CPC ............ *H04L 47/12* (2013.01); *H04L 5/0055* (2013.01); *H04L 41/5009* (2013.01); *H04L 43/062* (2013.01); *H04L 47/11* (2013.01); *H04L 49/25* (2013.01); *H04L 49/50* (2013.01)

(58) Field of Classification Search
None
See application file for complete search history.

(56) References Cited

U.S. PATENT DOCUMENTS 6,775,234 B1 * 8/2004 Garcia-Martin ... H04Q 11/0457
370/385
10,608,939 B1 * 3/2020 Kim ...................... H04L 43/062
(Continued)

*Primary Examiner* — Jutai Kao
(74) *Attorney, Agent, or Firm* — Patterson + Sheridan, LLP

(57) ABSTRACT

Techniques for identifying network congestion and adapting network performance to relieve the network congestion are described. As described, a network element such as a switch reports network congestion indicators such as link level control frames to a network controller. The network controller uses the network congestion indicators reported from the network elements to identify congestion points, data traffic, and data flows experiencing congestion at a network level. The network controller then determines optimized control parameters for the network in order to reduce or alleviate the congestion at the congestion points.

18 Claims, 9 Drawing Sheets

(56) References Cited

U.S. PATENT DOCUMENTS

| | | | |
|---|---|---|---|
| 2007/0127381 A1* | 6/2007 | Oh | H04L 47/11 370/235 |
| 2009/0232001 A1* | 9/2009 | Gong | H04W 28/0289 370/236 |
| 2013/0294244 A1* | 11/2013 | Fujita | H04W 28/021 370/235 |
| 2014/0269325 A1* | 9/2014 | Chrysos | H04L 49/506 370/237 |

* cited by examiner

CONGESTION NOTIFICATION REPORTING FOR A RESPONSIVE NETWORK

CROSS-REFERENCE TO RELATED APPLICATIONS

This application is a continuation of co-pending U.S. patent application Ser. No. 17/339,788, filed Jun. 4, 2021, which is a divisional of U.S. patent application Ser. No. 16/172,762, filed Oct. 27, 2018, which issued on Jul. 6, 2021 as U.S. Pat. No. 11,057,305. The aforementioned related patent application is herein incorporated by reference in its entirety.

TECHNICAL FIELD

Embodiments presented in this disclosure generally relate to identifying network congestion and adapting network performance to relieve the network congestion. More specifically, embodiments disclosed herein provide for transmitting network congestion indicators from network switches to a network controller and assessing the network congestion and adaptations for the network at the network controller.

BACKGROUND

Since the beginning of computer implemented networks, congestion at certain components of the network (e.g., network switches), has existed. As networks, including distributed networks, cloud based networks, and datacenter networks, grow in size and complexity, congestion has become an increasingly important factor that must be handled in order to ensure proper functioning of the network and the applications and services using and/or executing on the networks. Current methods for reducing congestion include a wide range of congestion management and pushback signaling schemes at a network element (e.g., switch level). These schemes all include signaling components (e.g., specially formatted frames or header markings) to provide a distributed way for network elements to respond to congestion immediately. However, none of these schemes support long-term views of the network or congestion over time, or a precise identification of problematic and congestion causing flows in an end-to-end fashion, thus limiting the response to congestion at a network element level and not at a quick network-level response.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
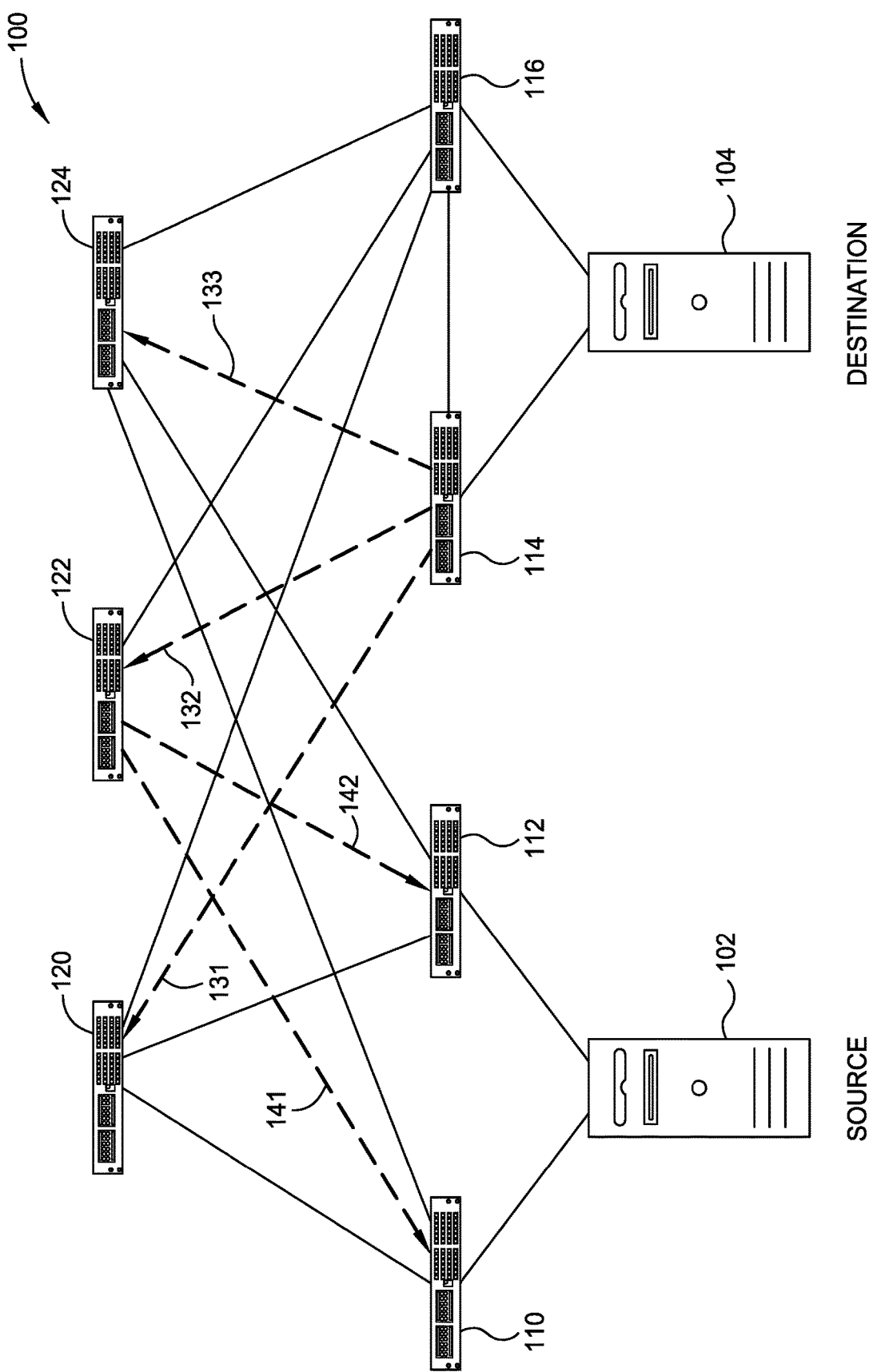
FIG. 1 illustrates a network, according to one embodiment.

One embodiment presented in this disclosure includes a system of one or more computers that can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method including receiving, at a network switch, network congestion indicators for data traffic, replicating the network congestion indicators for transmission to a network controller, and transmitting the replicated network congestion indicators to the network controller. The method also includes receiving optimized network control parameters for the data traffic from the network controller and executing the optimized network control parameters for the data traffic at the network switch. Other embodiments of this aspect include corresponding computer systems, apparatus, and computer programs recorded on one or more computer storage devices, each configured to perform the actions of the methods.

Another example embodiment includes a computer program product. The computer program product including a computer-readable storage medium having computer-readable program code embodied therewith, the computer-readable program code executable by one or more computer processors to perform an operation. The operation includes receiving, at a network switch, network congestion indicators for data traffic, replicating the network congestion indicators for transmission to a network controller, and transmitting the replicated network congestion indicators to the network controller. The operation also includes receiving optimized network control parameters for the data traffic from the network controller and executing the optimized network control parameters for the data traffic at the network switch.

One embodiment presented in this disclosure includes another system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method including: receiving, at a network controller for a network, network congestion indicators for data traffic from a reporting network element, identifying from the replicated network congestion indicators network congestion conditions for the data traffic, and determining, from the network congestion indicators, one or more congestion points in the network. The method also includes determining optimized control parameters for the network to mitigate the one or more congestion points in the network and broadcasting the optimized control parameters to one or more network switches. Other embodiments of this aspect include corresponding computer systems, apparatus, and computer programs recorded on one or more computer storage devices, each configured to perform the actions of the methods.

Example Embodiments

As described above, current network congestion schemes utilize link to link protocols or messages to detect and/or adjust to congestion in the network. In many examples of these protocols, messages are included that are only considered meaningful between link partners (e.g., PAUSE frames, priority flow control (PFC) frames, some Fibre Channel (FC) frames, and link-level primitives such as link-level messages and/or datagrams), such that network elements making up the link partners (e.g., switches, hosts, etc.) typically drop these flow control frames immediately after processing to save internal switch bandwidth. Thus, when a management layer of the network intends to query the operation of a flow control protocol, the hardware provides an array of counters, which provides important information related to congestion and pushback signaling (e.g., PAUSE frames received or sent). For example, a counter at the network element may record five congestion events (e.g., congestion and pushback signaling received at the network element) during a certain period (e.g., a 24 hour period). In some examples, the arrays include information per port and/or by class, FC tokens expended or received, and time spent by an element in an enforcement state, among other examples. This counter information can provide valuable insight into the functioning (or malfunctioning) of a network; however, the associated debug elements multiply as network administrators desire increased granularity in spotting congested or problematic components of the network. This also increases the processing requirements for the network elements and reduces resources available to process network traffic.

While the congestion and pushback signaling can provide valuable information about current network conditions, the current counter schemes cannot communicate the temporal characteristics of the congestion signaling with sufficient precision for a network administrator to react once the problem has been pinpointed. For example, a network element counter may record five congestion events during a time period, but only report the count once a day to the network controller. Thus, the controller cannot react immediately to problems in the network and over time, the counters can fail to characterize problems during debug processes many days later, as counters may have been saturated with data, rolled over, or have been unwittingly cleared.

In addition, some of these schemes are intended to support environments where the network does not drop data packets, like storage or remote direct memory access RDMA over Converged Ethernet (RoCE) applications. In these cases, the administrators configure the network switches to signal for flow control before their buffers begin dropping data packets. If a telemetry scheme uses replication of dropped packets (such as SPAN-on-drop) to identify problematic conditions, such a scheme will not work in a no-drop environment. Thus, debugging the network using dropped packets statistics becomes impossible since no dropped packets will be reported to the network controller.

Additionally, as networks become increasingly larger, the collection and interpretation of the counter information become time and resource intensive. The identification of problematic parts of the network also become less precise due to the large amounts of processing needed and the time lag between the initiation of the problem and the network level detection of the problem.

The embodiments described herein, provide a method for immediately informing a network controller of link level events from network elements so that the network controller can granularly adapt to detected problems/congestion in the network at a network level. For example, the embodiments described herein include encapsulating and replicating link-level frames, containing flow control signaling, at a network element (e.g., a network switch) and sending the link level frames to a network's controller (e.g., a Software Defined Networking (SDN) controller and/or analytics appliance/application/program). In general, the network controller detects, tracks, and records network congestion indicators (e.g., frequency of flow control events per switch-port over time) received from network elements including switches. The network controller, as described herein, also performs per-flow analytics and maps congestion events to both network elements (e.g., switches) and to applications. The controller also, on initiation of long-lived data flows like data-transfers or backups, takes this congestion history into account when selecting a path for the data flow. The controller then uses historical congestion data to select less active nodes to carry the long-lived flow, thereby mitigating the impact to other applications in the network. For example, the controller determines when, in time, the congestion frames are/were received, which the controller uses to identify less active network element nodes for application traffic during various times of day/month/year as the network data flows (e.g., data-transfer/back-ups) follow periodicity. The network controller then initiates new data flows along a path using the less active network elements, reducing and/or avoiding congestion.

Turning now to, FIG. 1 which illustrates a network, according to one embodiment. As shown, the network 100 includes a data flow source 102 and a data flow destination 104. The data flow from the source 102 to the destination 104 is routed through the various network elements including the network switches 110-116 and 120-124. The route the data flow takes from the source 102 to the destination 104 is defined by a network controller, shown in FIG. 2. In some examples, the switch 114 experiences congestion, such that it transmits link level frames 131, 132, and 133 indicating the congestion to the link level partners such as switches 120, 122, and 124. As also shown in FIG. 1, the congestion can cause cascading problems throughout the network when, for example, switch 122 then transmits link level frames 141 and 142 indicating the congestion at switch 114 to its link level partner switches 110 and 112.

As example of previous methods for network congestion, if a network administrator of network 100, is alerted to or notices low bandwidth utilization for a number of switches in the network, such as switches 114, 122, 124, etc., the other techniques to diagnose such a problem could be to query counters on the switches (e.g., switches 122, 120, 112, 114, 124, etc.), using a screen-scraping script, or by manually logging into each switch. These techniques are a reactive process, not a proactive one, and if the congestion shown in FIG. 1 is a sporadic event, the network administrator using a network controller may only be able to implement a delayed reaction to the congestion. Further, by the time the administrator reacts, the flow control counters at the sampled switches may be polluted with the results of many congestion events, and which makes it difficult to pinpoint the culprit flows or a congestion point.

According to the embodiments described herein, a congestion control module, at a network controller, receives all of the flow control signals in the network in real-time. For example, the link level frames 131, 132, 133, 141, and 142 are replicated to the network controller and the congestion control module. The congestion control module then processes the congestion information and groups the events spatially and temporally to isolate a group of congested switches and links for the current congestion event (e.g., identifies the congested switch 114 and source switches 110 and 112), using network level information that would be difficult for the individual switches to process and implement. As also described herein, the congestion control module also groups congestion events to discern congestion patterns, to inform a network administrator about misbehaving or sub-optimally provisioned applications (e.g., applications that routinely experience or cause network congestion).

As described above, in other schemes, these events would all be counted and reported to a network controller periodically, but the identification of switch 114 as a congested switch would be time/resource intensive and ultimately delayed since the count reporting does not happen in real time. As described in the embodiments herein, each of the switches can immediately report the reception of the link level frames indicating congestion to the network controller, providing for the detection of immediate microbursts of congestion and/or for the detection of long term congestion or network flow trends. Further, as the embodiments described herein utilize replicated raw flow control packets at the network controller the need to redesign network hardware with additional debug registers when a network users' needs change is eliminated. In previous examples, if a network administrator desired to analyze a number of PAUSE frames per port and/or per class, in a manner where the number of PAUSE frames are aggregated and sampled once per 500 ms over the course of the last 10 seconds, a nontrivial number of register additions in the network hardware would be required. As described herein, the network controller handles this analysis without additional hardware modifications. Additionally, when a network user requires new data or analytics, the congestion control module can quickly adapt, at the network controller.

Figure 2:
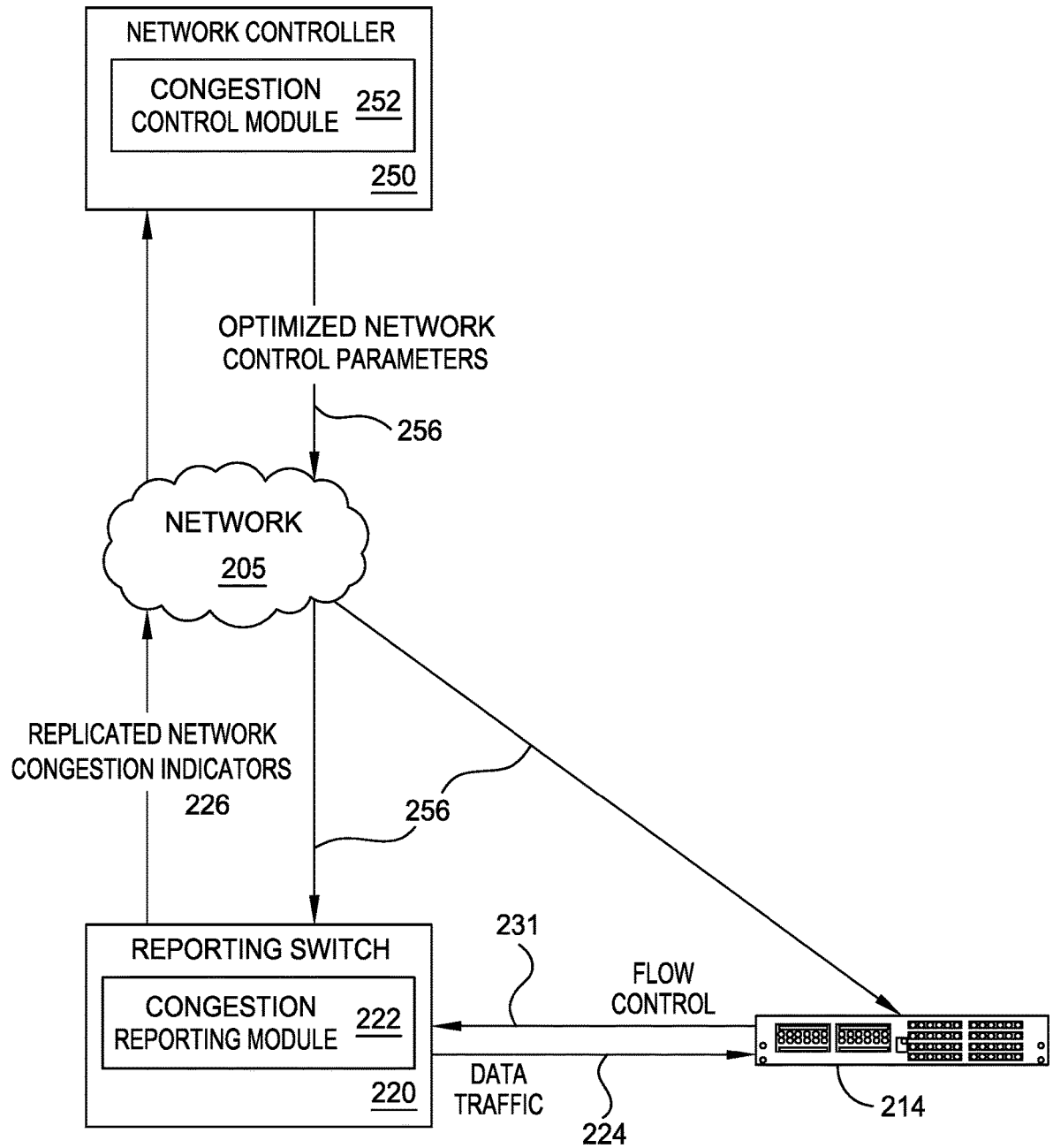
FIG. 2 is a block diagram of a system for congestion notification, according to one embodiment.

FIG. 2 is a block diagram of a system for congestion notification, according to one embodiment. As shown, a reporting switch 220 sends data traffic 224 as part of a data flow to a congested network element, such as congested switch 214. The congested switch 214 then responds to the reporting switch 220 with network congestion indicators such as a flow control message 231. The flow control message 231, in general seeks to change the behavior of the data traffic 224 and mitigate the congestion at the congested switch 214. The message 231 may include a PAUSE frame, an acknowledgment (ACK) frame, and/or a link control frame received from congested switch 214, and/or end-to-end notifications including Early Congestion Notification, Transmission Control Protocol (TCP) ACKs, etc. . . . . The reporting switch 220 receives and processes the message 231 according to whichever protocol the message takes. For example the switch 220 implements a pause in the data traffic 224 according to a received PAUSE frame. The congestion reporting module 222 then, instead of dropping the message 231, prepares the message for reporting to a network controller 250. In some examples, preparing the message for reporting to the network controller 250 includes replicating the network congestion indicators for transmission to the network controller 250, as further described in relation to FIG. 5. As shown in FIG. 2, the reporting switch then transmits the replicated network congestion indicators 226 to the network controller 250 via a network 205.

Figure 7:
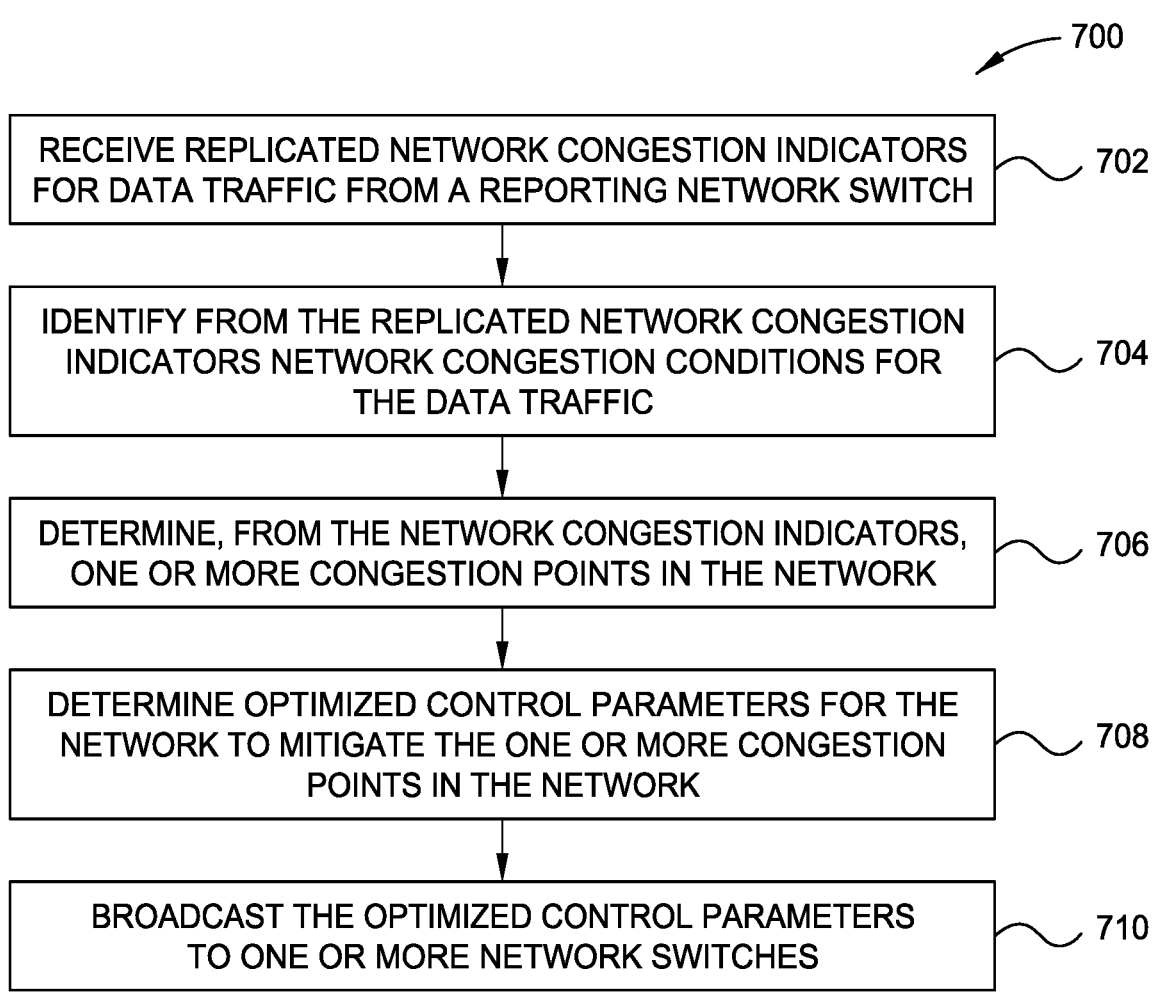
FIGS. 7-11 are methods for congestion reporting at a network controller, according to embodiments.

The network controller 250 includes a congestion control module 252 which receives the network congestion indicators for a data flow from the reporting network element 220 and identifies from the replicated network congestion indicators network congestion conditions for the data traffic (as described in relation to FIG. 7). The congestion control module 252 also determines one or more congestion points in the network and determines optimized control parameters for the network to mitigate the one or more congestion points in the network (as described in relation to FIG. 8). The network controller 250 then broadcasts the optimized control parameters 256 to one or more network switches including the reporting switch 220 and the congested switch 214 among other switches in a network, such as network 100 described in relation to FIG. 1.

Figure 3:
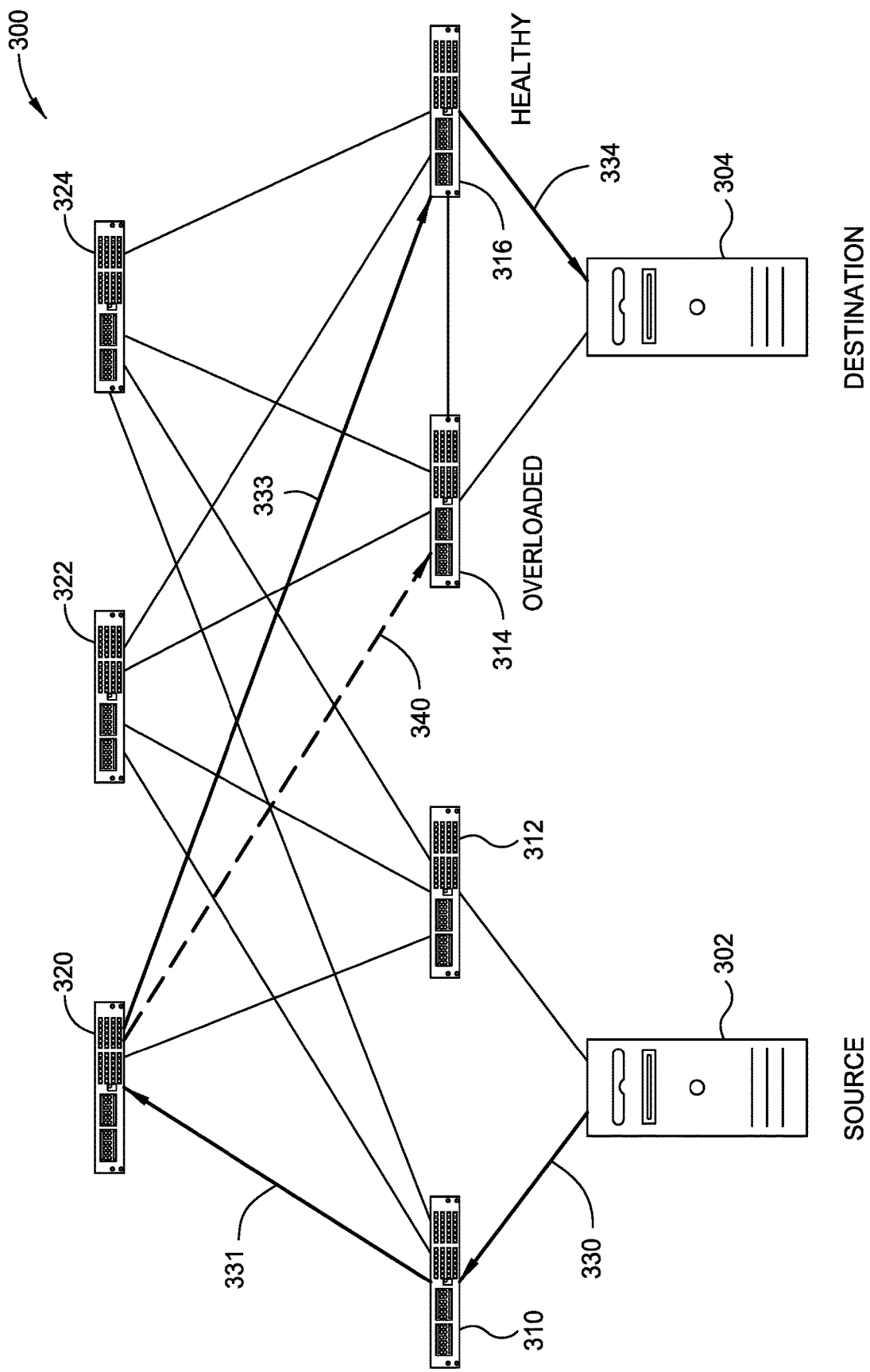
FIG. 3 illustrates a network, according to one embodiment.

FIG. 3 illustrates a network, according to one embodiment. As shown, the network 300 is a network implementing the optimized control parameters, such as the optimized control parameters determined by the congestion control module 252. For example, the network 300 includes a congested or overloaded switch 314. Upon determining that the switch 314 is congested or overload, the congestion control module 252 broadcasts the optimized control parameters to a selection and/or all of the network elements including switches 310-316 and 320-324. The congestion control module 252 also directs any new data flows to bypass the congested switch 314. For example, when source 302 seeks to initiate a new data flow to destination 304, the network controller 250 directs the data flow to utilize hops 330, 331, 333, and 334 shown in FIG. 3. This allows the new data flow from source 302 to destination 304 to utilize the healthy switch 316 instead of the congested switch 314 through hop 340.

Figure 4:
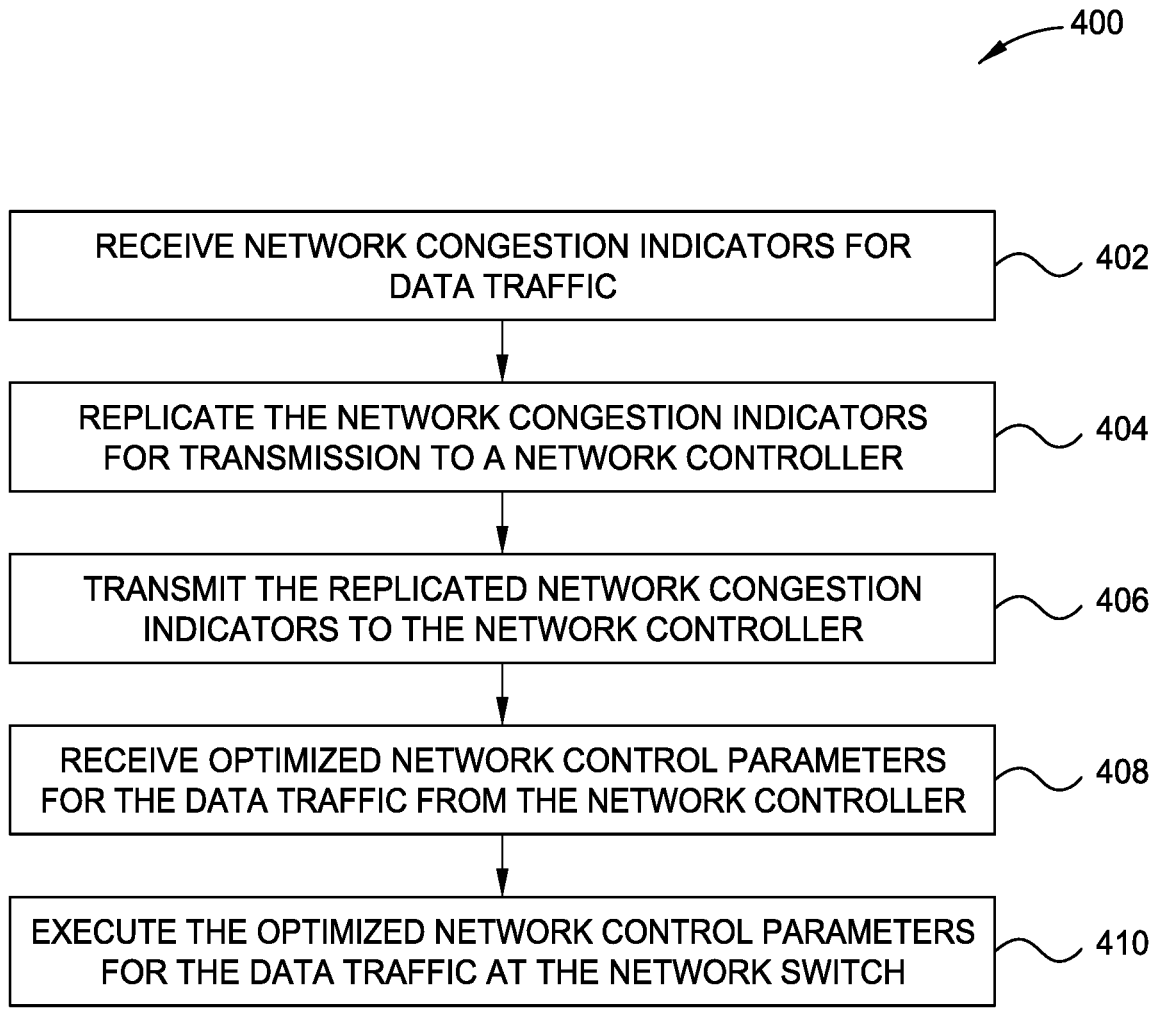
FIGS. 4-6 are methods for congestion reporting at a network element, according to embodiments.

FIG. 4 is a method for congestion reporting at a network element, according to one embodiment. As described herein, method 400 is a method for reporting network congestion indicators to a network controller, such that the network controller can respond to the network congestion at a network level. Method 400 begins at block 402 where a network element, such as reporting switch 220, including congestion reporting module 222, receives network congestion indicators for data traffic (e.g., a single data flow and/or all data traffic between the reporting switch and a congested switch). For example, as described in relation to FIG. 2, the switch 220 receives message 231 indicating some action for the reporting switch to take to avoid further congestion at congested switch 214. In some examples, the message 231 includes a PAUSE frame received from another network switch (e.g., the congested switch 214), an acknowledgment (ACK) frame received from the another switch, and/or a link control frame received from the another network switch. In the example, that the message 231 is a PAUSE frame, the PAUSE frame may include a period of time (e.g., PAUSE quanta time value, PAUSE quanta time values for multiple traffic classes, etc.) for the reporting switch 220 to stop transmitting data flows to the congested switch 214. In some examples, the PAUSE frame may be a repeat PAUSE frame indicating the transmission of the data flows to the congested switch 214 should remain stopped. In some examples, the message 231 is a message for a credit based system where the switch 220 sends frames to the congested switch 214 up to a negotiated credit amount. The congested switch 214 will return the credits back to the sender as it processes the received frames. These types of FC control frames (ACKs, or R_RDY) are then monitored to determine the data flow level. In some examples, the message 231 includes an FC acknowledgement (ACK) frame received from a peer switch (e.g., the another switch) and/or a FC a link control frame received from a peer switch (e.g., the another network switch).

At block 404, the reporting switch 220, including congestion reporting module 222, replicates the network congestion indicators for transmission to a network controller. In some examples, the reporting switch 220, uses medium access control (MAC) and parsing logic to identify the as eligible for replication by ERSPAN and permit the frames for replication instead of immediately discarding the frames.

At block 406 the reporting switch 220, including congestion reporting module 222, transmits the replicated network congestion indicators to the network controller.

At block 408 the reporting switch 220, including congestion reporting module 222, receives optimized network control parameters for the data flow from the network controller.

At block 410 the reporting switch 220, including congestion reporting module 222, executes the optimized network control parameters for the data traffic at the network switch. In some examples, executing the optimized network control parameters may include updating quality of service parameters at the network switch, updating congestion management protocol parameters, and/or updating a path for a new or existing data flow(s).

Figure 5:
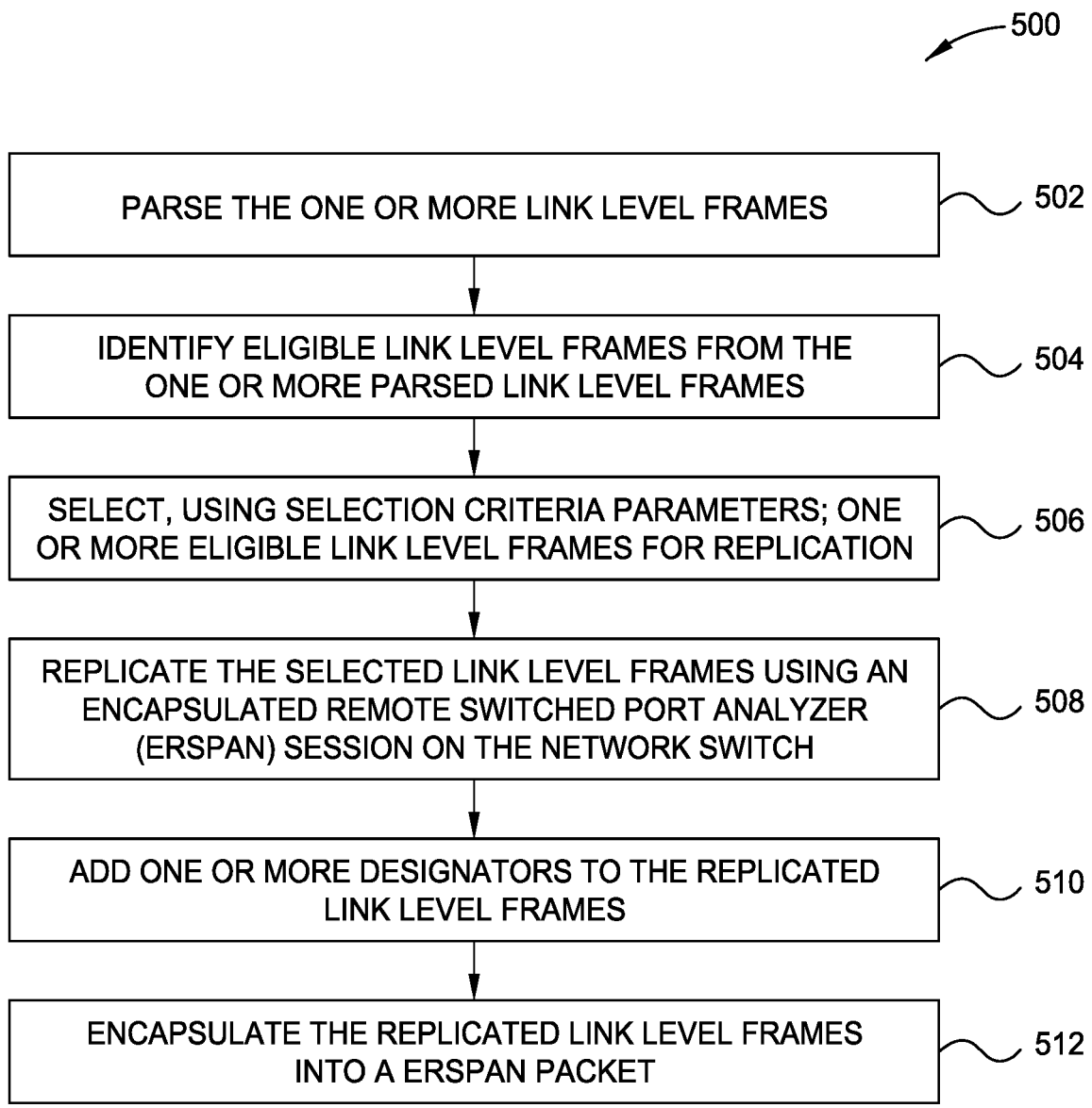

FIG. 5 is a method for replicating network congestion indicators for transmission to a network controller, according to one embodiment. Method 500 begins at block 502 where a network element, such as reporting switch 220, including congestion reporting module 222, parses the one or more link level frames.

At block 504 the reporting switch 220, including congestion reporting module 222, identifies eligible link level frames from the one or more parsed link level frames. In some examples, the reporting switch 220, uses MAC logic and parsing logic on the switch to identify which of the link level frames are eligible for replication. In some examples, factors used to identify eligible link level frames include length of PAUSE quanta (e.g., only replicate if PAUSE quanta is above a given level), number of flow control indicators seen in the past interval of time (e.g., only replicate if determined congestion is a sustained congestion), lack of credits returned (in the case of FC) for a given interval (which implicitly indicates congestion on a peer switch), a number of packets with congestion control information embedded (e.g., Explicit Congestion Notification (ECN), etc.) greater than a certain threshold, among other examples.

At block 506, the reporting switch 220, including congestion reporting module 222, selects, using selection criteria parameters; one or more eligible link level frames for replication. In some examples, the selection criteria parameters include a sampling interval, a frame protocol, a message category, an affected port, and/or an affected class (e.g., only select messages for a particular PFC class, etc.). For example, the reporting switch 220 may only select link-level frames for replication for class of service (CoS) 7, which carries control-plane traffic, that should never be paused, so any PFC for CoS 7 would indicate a significant congestion issue in the network. In contrast, CoS 0 being paused may present only a minor issue (minor congestion), if only network data-transfer/backup traffic uses CoS 0. Thus, only significant congestion related link-level frames may be selected for replication.

In some examples, the reporting switch 220 may only select link level frames at a given sampling interval to avoid wasting bandwidth between the reporting switch 220 and the network controller 250, while also representing critical congestion information. For example, the reporting switch 220 may use a bloom filter to filter and select link level frames which frequently occur. For example, a PAUSE frame coming from a particular source on a particular class that is coming often is selected for replication, whereas a PAUSE frame from a source and/or class that occurs only once is not selected for replication, since it is likely not a source of significant, sustained, and/or frequent congestion.

At block 508, the reporting switch 220, including congestion reporting module 222, replicates the selected link level frames using an ERSPAN session on the network switch. In some examples, the ERSPAN session replicates the selected link level frames in a format such that the ERSPAN session identifies the network controller 250 as a Switched Port Analyzer (SPAN) destination and the reporting switch 220 as a SPAN source. While described herein in relation to ERSPAN sessions, the embodiments described may use any encapsulation process which provides for forwarding to the network controller.

At block 510, the reporting switch 220, including congestion reporting module 222, adds one or more designators to the replicated link level frames. In some examples, these designator include a port identification (e.g., a port at the reporting switch associated with the congested switch), a traffic class designation, and/or a timestamp. For example, the reporting switch 220 adds an originating port in the payload of the replicated frames along with a timestamp (e.g., a timestamp generated by IEEE 1588 Precision Time Control) such that the network controller 250, can properly identify the source and time of the reported congestion indications. In one example, the reporting switch 220 also adds a traffic class designation to further allow analysis of the network congestion indicators. In some examples, the network controller uses the traffic class designation to identify an application or type of application associated with congestion. For example, for PFC, if a certain CoS is paused, the network controller may then determine actions for only data flows using that CoS, when determining optimized network control parameters.

At block 512, the reporting switch 220, including congestion reporting module 222, encapsulates the replicated link level frames into an ERSPAN packet. In some examples, the reporting switch 220, encapsulates the replicated link level frames and the added designators into the ERSPAN packet for transmission to the network controller 250.

Figure 6:
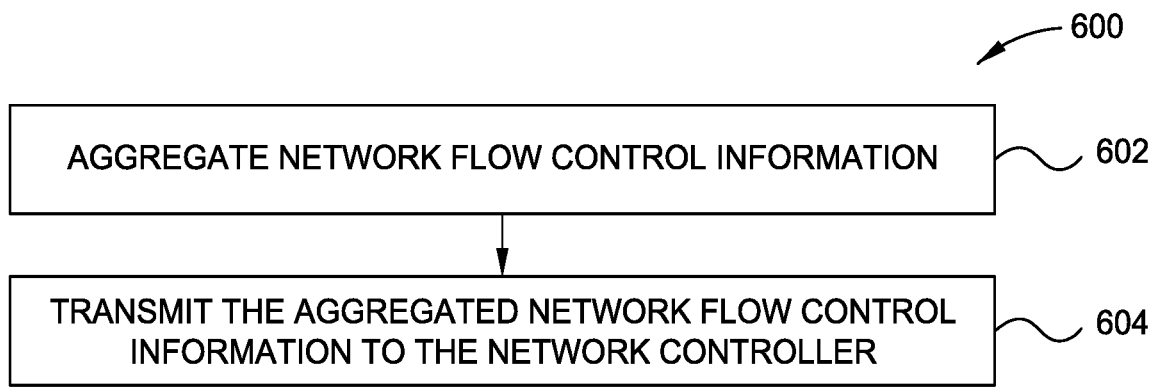

FIG. 6 is a method for congestion reporting at a network element, according to one embodiment. Method 600 begins at block 602 where a network element, such as reporting switch 220, including congestion reporting module 222, aggregates network flow control information. For example, the reporting switch 220 aggregates FC token primitives, which may not be replicable and prepares the aggregated information for transmission to the network controller. For example, chip level analytics data may be aggregated, encapsulated, and transmitted to the network controller. In this example, each congestion event (e.g., an FC credit is received/sent) is recorded with a timestamp and other identifying information (e.g., port/class). The recorded information is then aggregated and encapsulated (e.g., using an ERSPAN session) for reporting to the network controller. The network controller can then use the timestamp and other identifying information for each congestion event from the aggregated network flow control information, parsed at the network controller, to determine congestion points and optimized network parameters, as described herein.

At block 604, the reporting switch 220, including congestion reporting module 222, transmits the aggregated network flow control information to the network controller.

FIG. 7 is a method for congestion reporting at a network controller, according to one embodiment. As described herein, method 700 includes a method for receiving network congestion indicators at a network controller and using the received indicators to better manage the network to avoid congestion in the network. Method 700 begins at block 702 where a network controller, such as network controller 250, including congestion control module 252, receives replicated network congestion indicators for data traffic from a reporting network element. While described herein as related to a reporting switch 220, in some examples, the network controller receives multiple network congestion indicators for one or more data flows from several or all of the network elements/switches in the network, such as the multiple network elements described in relation to FIGS. 1 and 3.

At block 704, where the network controller 250, including congestion control module 252, identifies from the replicated network congestion indicators network congestion conditions for the data traffic. For example, the congestion control module 252 identifies the type of network congestion conditions (e.g., a PAUSE frame, an acknowledgment (ACK) frame, and/or a link control frame) and other added designators as further described in relation to FIG. 8.

At block 706, the network controller 250, including congestion control module 252, determines, from the network congestion indicators, one or more congestion points in the network. For example, the network controller 250 using the network congestion indicator identifies the switch 314 described in relation to FIG. 3, as congested or overloaded.

At block 708, the network controller 250, including congestion control module 252, determines optimized control parameters for the network to mitigate the one or more congestion points in the network. In some examples, optimized control parameters may include optimized buffer allocations, scheduler bandwidth allocations, and/or scheduling priority. For example, if the congestion indicators reveal that a particular class of traffic is congesting a switch, then the network controller configures the optimized control parameters to include a higher buffer allocation or scheduling priority for the traffic at the egress switch and/or lower buffer allocation or scheduling priority for the traffic at the ingress switch. Additionally, in some examples, the network controller determines optimized control parameters which will cause data traffic to utilize port channels to direct a different percentage of traffic across different paths in the network (e.g., via Equal-cost multi-path routing (ECMP) and associated weights in the forwarding tables). For example, as shown in FIG. 3, if data traffic between source 302 and destination 304 takes a route using switch 310 through switches 320 or 322, and 314 with equal weight on 320 and 322, the proportion is shifted to direct more traffic along a less congested path (e.g., from 320 to 322).

At block 710, the network controller 250, including congestion control module 252, broadcasts the optimized control parameters to one or more network switches. For example, the congestion control module 252 broadcasts the optimized control parameters to each of the switches, including the congested switch 314 as described in relation to FIG. 3. This allows for network level adaptation to the detected congestion.

Figure 8:
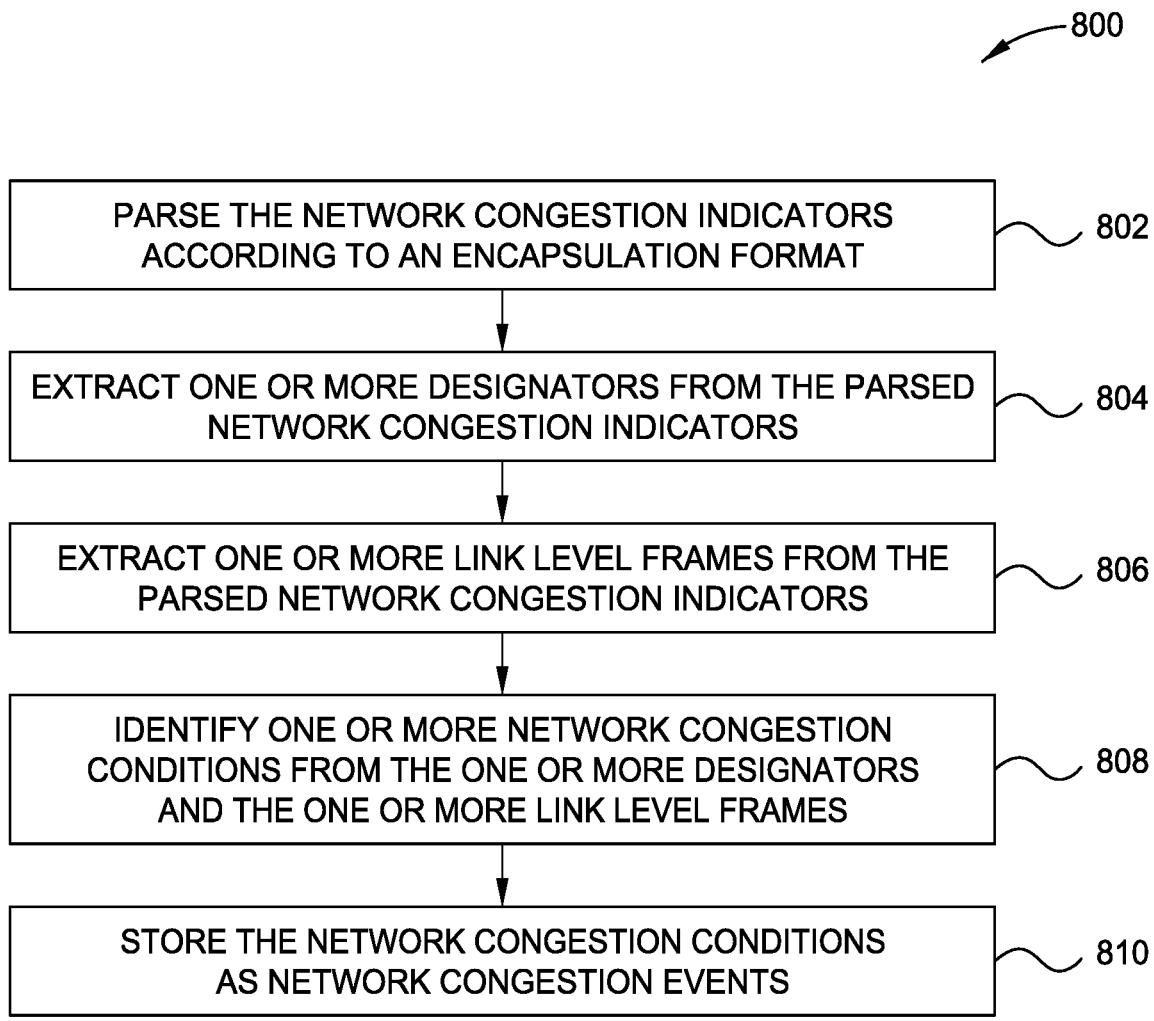

FIG. 8 is a method for identifying the network congestion conditions for data traffic, according to one embodiment. Method 800 begins at block 802 where a network controller, such as network controller 250, including congestion control module 252, parses the network congestion indicators according to an encapsulation format. For example, the congestion control module parses the received network congestion indicators, encapsulated as an ERSPAN packet, according to a parsing method for the ERSPAN packet.

At block 804, the network controller 250, including congestion control module 252, extracts one or more designators from the parsed network congestion indicators. For example, the congestion control module 252 identifies a port identification, a traffic class designation, and/or a timestamp from the parsed network congestion indicators. For example, the congestion control module identifies the time and source of the network congestion indicator as the congested switch 214 at a specific time.

At block 806, the network controller 250, including congestion control module 252, extracts one or more link level frames from the parsed network congestion indicators. For example, the congestion control module 252 extracts the link level frames from the parsed ERSPAN packet. The extraction can also aid in identifying network conditions. For example, an extracted PAUSE frame may include an affected class of service and a PAUSE quanta.

At block 808, the network controller 250, including congestion control module 252, identifies one or more network congestion condition from the one or more designators and one or more link level frames. In some examples, the congestion control module 252, identifies from the one or more designators and one or more link level frames precise information on the volume, timing, location, and nature of any data flow control events, such as the time location, and other information for a PAUSE control frame event.

At block 810, the network controller 250, including congestion control module 252, stores the network congestion conditions as network congestion events. For example, the network controller 250 stores the one or more network congestion conditions as a network congestion event. These network congestion events may then be used by the congestion control module 252 for further analysis of the network and identification of congestion points in the network. For example, the congestion control module 252 may use the network congestion events and the network congestion conditions to identify problematic data flows in the network and/or network hotspots that routinely experience congestion or other problematic conditions.

Figure 9:
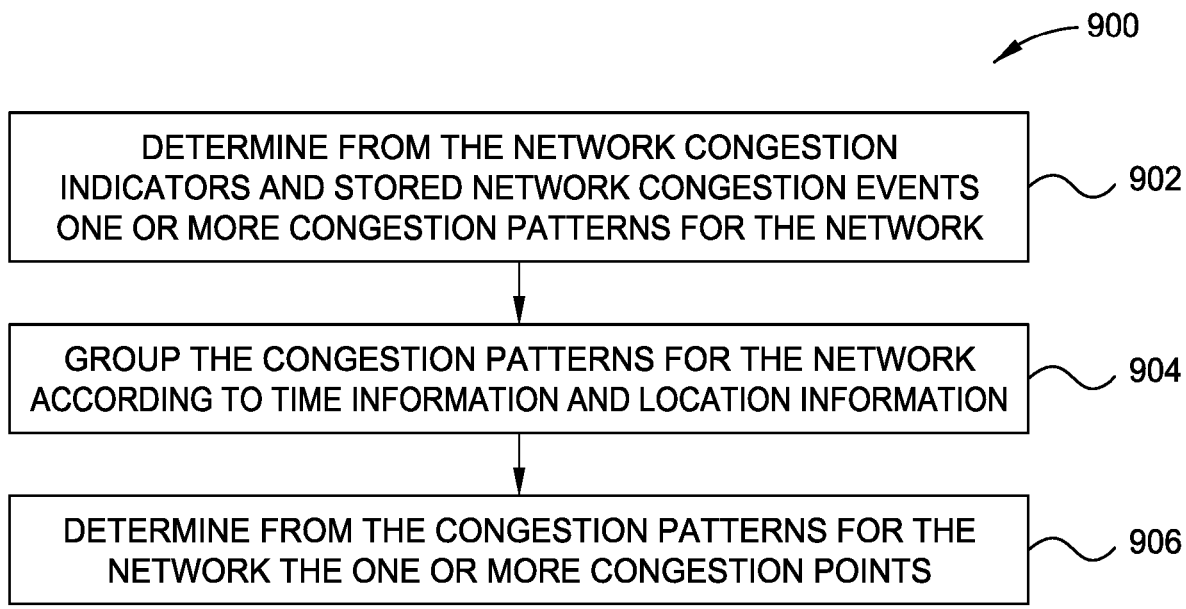

FIG. 9 is a method for determining congestion points in a network, according to one embodiment. Method 900 begins at block 902 where a network controller, such as network controller 250, including congestion control module 252, determines from the network congestion indicators and stored network congestion events one or more congestion patterns for the network. For example, the network controller identifies data flows and congested switches, ports, and/or classes associated with the data flows.

At block 904, the network controller 250, including congestion control module 252, groups the congestion patterns for the network based on time information and location information. For example, the network controller 250 correlates timestamp information and location information to identify data flows causing congestion.

At block 906, the network controller 250, including congestion control module 252, determines from the congestion patterns for the network the one or more congestion points. For example, chronically congested links on a switch generate a higher number of congestion signals, or report a higher number of congestive events as indicated by congestion indicators, than other switches in the network. In another example, in acutely congested congestion points, a switch shows that it is experiencing a severe and continuing congestive event by continuing to send pause frames at a higher than normal rate.

Figure 10:
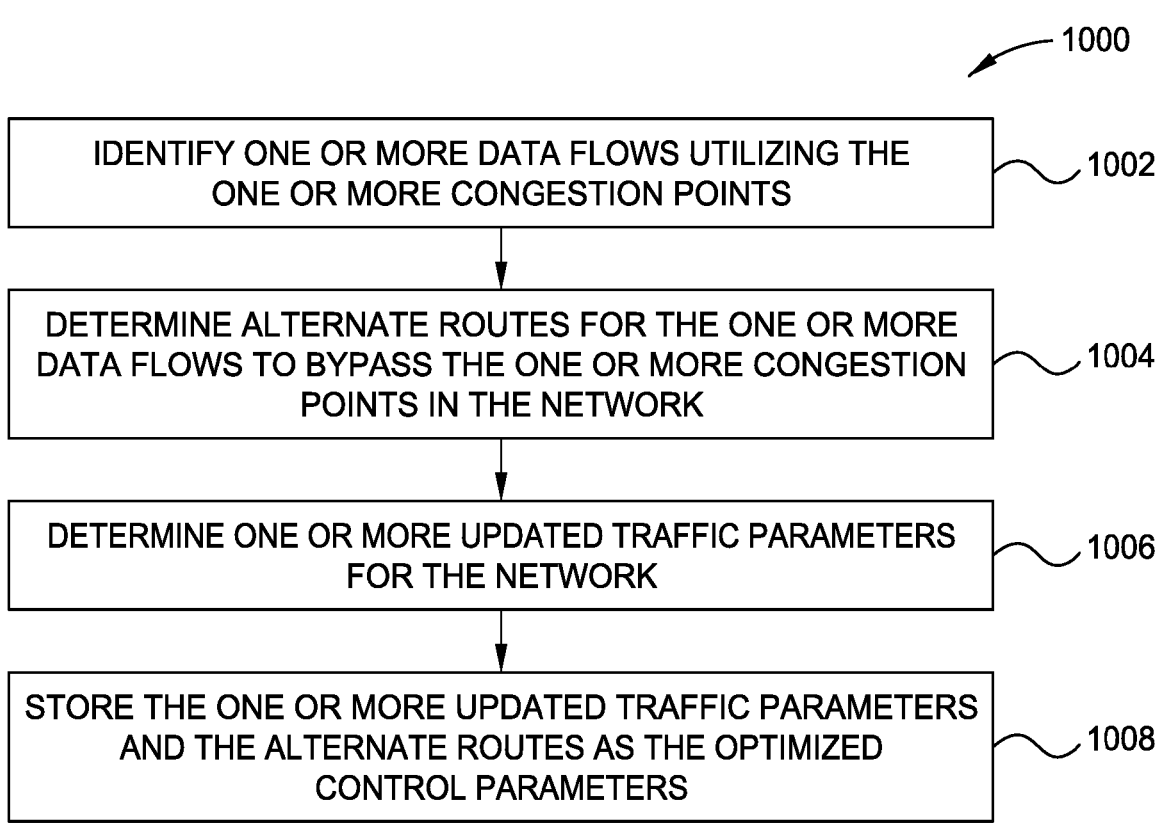

FIG. 10 is a method determining the optimized control parameters, according to one embodiment. Method 1000 begins at block 1002 where a network controller, such as network controller 250, including congestion control module 252, identifies one or more data flows utilizing the one or more congestion points.

At block 1004, the network controller, such as network controller 250, including congestion control module 252, determines alternate routes for the one or more data flows to bypass the one or more congestion points in the network. In some examples, the optimized control parameters include rerouting a new data flow that has historically used a congested switch and/or caused congestion at a switch may be routed to avoid the congestion point.

At block 1006, the network controller 250, including congestion control module 252, determines one or more updated traffic parameters for the network. The updated one or more traffic parameters may include updated quality of service parameters and/or forwarding/routing information for the one or more congestion points. The updated one or more traffic parameters may also include updated congestion management protocol parameters for the one or more congestion points including an updated PAUSE quanta, an updated reassertion interval, and/or an updated reassertion threshold.

At block 1008, the network controller 250, including congestion control module 252, stores the one or more updated traffic parameters and the alternate routes as the optimized control parameters.

Figure 11:
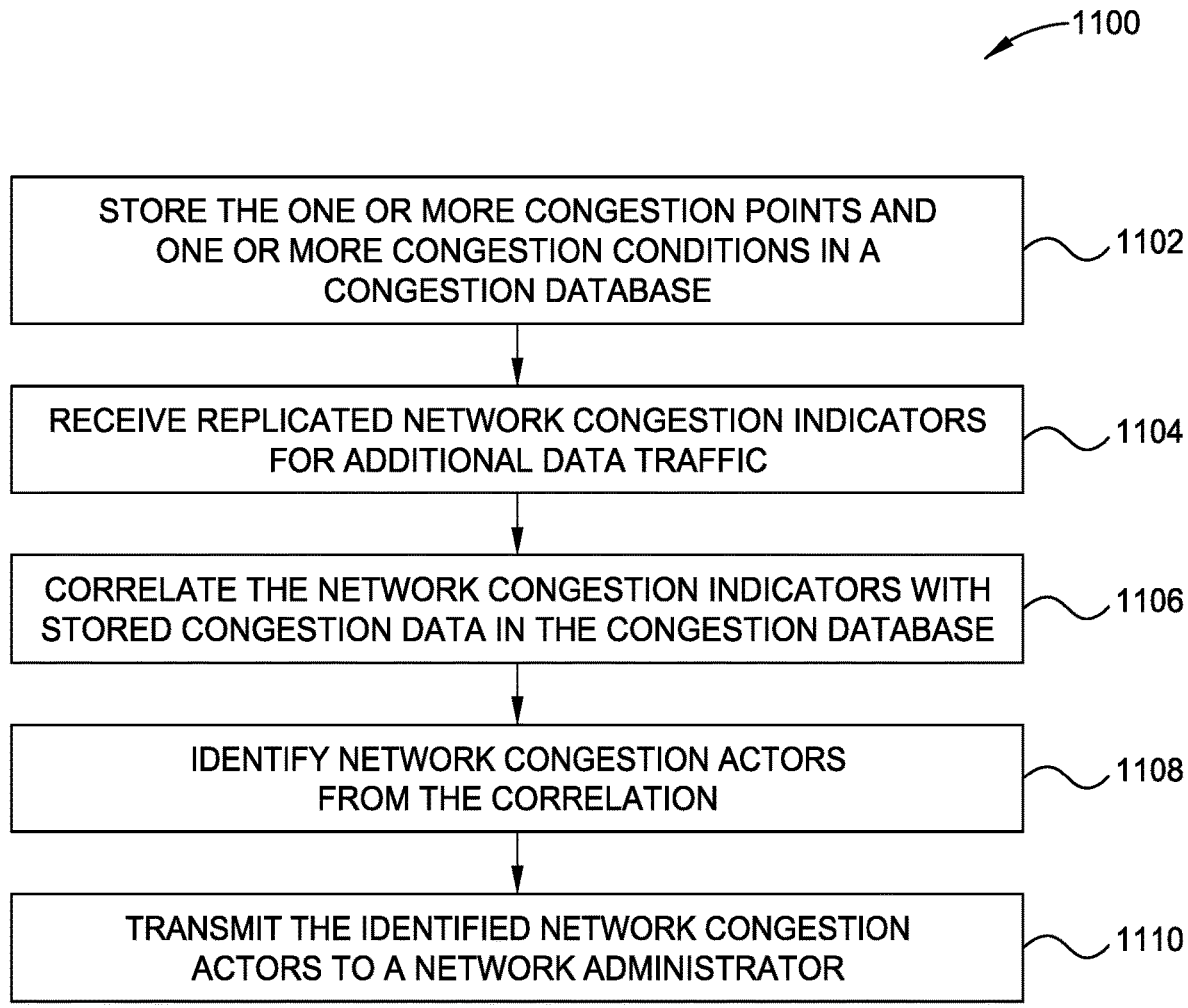

FIG. 11 is a method for determining congestion points in a network using received network indicators and historical network performance, according to one embodiment. Method 1100 begins at block 1102 where a network controller, such as network controller 250, including congestion control module 252, stores the one or more congestion points and one or more congestion conditions in a congestion database.

At block 1104, the network controller 250, including congestion control module 252, receives replicated network congestion indicators for additional data traffic.

At block 1106, the network controller 250, including congestion control module 252, correlates the network congestion indicators with stored congestion data in the congestion database. For example, the time of the congestion, the source of the congestion, and the severity of the congestion in the network congestion indicators is correlated with the stored historical time/source/severity information such that frequent congestion actors (congestion points and/or data flows) can be identified.

At block 1108, the network controller 250, including congestion control module 252, identifies network congestion actors from the correlation. In some examples, the network congestion actors include congestion points (network elements) and/or data flows frequently causing network congestion. In some examples, other types of congestion patterns can be identified and used to map the congestion patterns to the congestion actors.

Method 1100 continues at block 1110, where the network controller, such as network controller 250, including congestion control module 252, transmits the identified network congestion actors to a network administrator.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the congestion control module) or related data available in the cloud. For example, the congestion control module could execute on a computing system in the cloud. Doing so allows a user to access this information from any computing system attached to a network connected to the cloud (e.g., the Internet).

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
   identifying, using replicated network congestion indicators, network congestion conditions for data traffic in a network;
   determining, from the replicated network congestion indicators and the network congestion conditions, one or more congestion points in the network;
   determining optimized control parameters for the network to mitigate the one or more congestion points in the network; and
   broadcasting the optimized control parameters to one or more network switches.

2. The method of claim 1, wherein identifying the network congestion conditions for the data traffic further comprises:
   parsing the replicated network congestion indicators according to an encapsulation format;
   extracting one or more designators from the parsed network congestion indicators;
   extracting one or more link level frames from the parsed network congestion indicators;
   identifying one or more network congestion conditions from the one or more designators and the one or more link level frames; and
   storing the network congestion conditions as network congestion events.

3. The method of claim 1, wherein determining the one or more congestion points in the network comprises:

determining from the replicated network congestion indicators and stored network congestion events one or more congestion patterns for the network;
grouping the congestion patterns for the network according to time and location information; and
determining, from the congestion patterns for the network, the one or more congestion points.

4. The method of claim 1, wherein determining the optimized control parameters for the network to mitigate the one or more congestion points in the network comprises:
identifying one or more data flows utilizing the one or more congestion points;
determining alternate routes for the one or more data flows to bypass the one or more congestion points in the network;
determining one or more updated traffic parameters for the network; and
storing the one or more updated traffic parameters and the alternate routes as the optimized control parameters.

5. The method of claim 4, wherein the one or more updated traffic parameters comprises one or more of:
updated quality of service parameters for the one or more congestion points; and
updated congestion management protocol parameters for the one or more congestion points, wherein the updated congestion management protocol parameters comprise one or more of:
an updated PAUSE quanta;
an updated reassertion interval;
an updated buffer allocation;
and updated scheduling priority; and
an updated reassertion threshold.

6. The method of claim 1, further comprising:
storing the one or more congestion points and one or more congestion conditions in a congestion database;
receiving replicated network congestion indicators for additional data traffic;
correlating the replicated network congestion indicators for the additional data traffic with stored congestion data in the congestion database;
identifying network congestion actors from the correlation; and
transmitting the identified network congestion actors to a network administrator.

7. A non-transitory computer-readable storage medium having computer-readable program code embodied therewith, the computer-readable program code executable by one or more computer processors to perform an operation, the operation comprising:
identifying, using replicated network congestion indicators, network congestion conditions for data traffic in a network;
determining, from the replicated network congestion indicators and the network congestion conditions, one or more congestion points in the network;
determining optimized control parameters for the network to mitigate the one or more congestion points in the network; and
broadcasting the optimized control parameters to one or more network switches.

8. The non-transitory computer-readable storage medium of claim 7, wherein identifying the replicated network congestion conditions for the data traffic further comprises:
parsing the replicated network congestion indicators according to an encapsulation format;
extracting one or more designators from the parsed network congestion indicators;
extracting one or more link level frames from the parsed network congestion indicators;
identifying one or more network congestion conditions from the one or more designators and the one or more link level frames; and
storing the network congestion conditions as network congestion events.

9. The non-transitory computer-readable storage medium of claim 8, wherein determining the one or more congestion points in the network comprises:
determining from the replicated network congestion indicators and stored network congestion events one or more congestion patterns for the network;
grouping the congestion patterns for the network according to time and location information; and
determining, from the congestion patterns for the network, the one or more congestion points.

10. The non-transitory computer-readable storage medium of claim 8, wherein determining the optimized control parameters for the network to mitigate the one or more congestion points in the network comprises:
identifying one or more data flows utilizing the one or more congestion points;
determining alternate routes for the one or more data flows to bypass the one or more congestion points in the network;
determining one or more updated traffic parameters for the network; and
storing the one or more updated traffic parameters and the alternate routes as the optimized control parameters.

11. The non-transitory computer-readable storage medium of claim 10, wherein the one or more updated traffic parameters comprises one or more of:
updated quality of service parameters for the one or more congestion points; and
updated congestion management protocol parameters for the one or more congestion points, wherein the updated congestion management protocol parameters comprise one or more of:
an updated PAUSA quanta;
an updated reassertion interval;
an updated buffer allocation;
and updated scheduling priority; and
an updated reassertion threshold.

12. The non-transitory computer-readable storage medium of claim 8, further comprising:
storing the one or more congestion points and one or more congestion conditions in a congestion database;
receiving replicated network congestion indicators for additional data traffic;
correlating the replicated network congestion indicators for the additional data traffic with stored congestion data in the congestion database;
identifying network congestion actors from the correlation; and
transmitting the identified network congestion actors to a network administrator.

13. A system, comprising:
one or more processors; and
memory comprising instructions which, when executed on any combination of the one or more processors, performs an operation, the operation comprising:
identifying, using replicated network congestion indicators, network congestion conditions for data traffic in a network;

determining, from the replicated network congestion indicators and the network congestion conditions, one or more congestion points in the network;

determining optimized control parameters for the network to mitigate the one or more congestion points in the network; and broadcasting the optimized control parameters to one or more network switches.

14. The system of claim 13, wherein identifying the network congestion conditions for the data traffic further comprises:

parsing the replicated network congestion indicators according to an encapsulation format;

extracting one or more designators from the parsed network congestion indicators;

extracting one or more link level frames from the parsed network congestion indicators;

identifying one or more network congestion conditions from the one or more designators and the one or more link level frames; and storing the network congestion conditions as network congestion events.

15. The system of claim 13, wherein determining the one or more congestion points in the network comprises:

determining from the replicated network congestion indicators and stored network congestion events one or more congestion patterns for the network;

grouping the congestion patterns for the network according to time and location information; and determining, from the congestion patterns for the network, the one or more congestion points.

16. The system of claim 13, wherein determining the optimized control parameters for the network to mitigate the one or more congestion points in the network comprises:

identifying one or more data flows utilizing the one or more congestion points;

determining alternate routes for the one or more data flows to bypass the one or more congestion points in the network;

determining one or more updated traffic parameters for the network; and storing the one or more updated traffic parameters and the alternate routes as the optimized control parameters.

17. The system of claim 16, wherein the one or more updated traffic parameters comprises one or more of:

updated quality of service parameters for the one or more congestion points; and updated congestion management protocol parameters for the one or more congestion points, wherein the updated congestion management protocol parameters comprise one or more of:
  an updated PAUSA quanta;
  an updated reassertion interval;
  an updated buffer allocation;
  and updated scheduling priority; and
  an updated reassertion threshold.

18. The system of claim 13, further comprising:

storing the one or more congestion points and one or more congestion conditions in a congestion database;

receiving replicated network congestion indicators for additional data traffic;

correlating the replicated network congestion indicators for the additional data traffic with stored congestion data in the congestion database;

identifying network congestion actors from the correlation; and transmitting the identified network congestion actors to a network administrator.

* * * * *